(12) United States Patent
Shim et al.

(10) Patent No.: US 9,735,639 B2
(45) Date of Patent: Aug. 15, 2017

(54) BUS BAR AND MOTOR INCLUDING THE SAME

(71) Applicant: LG INNOTEK CO., LTD., Seoul (KR)

(72) Inventors: Woo seob Shim, Seoul (KR); Seong Jin Kim, Seoul (KR); Jinho Kim, Seoul (KR); Kyung Sang Park, Seoul (KR); Chang Hyun Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 381 days.

(21) Appl. No.: 14/487,397

(22) Filed: Sep. 16, 2014

(65) Prior Publication Data
US 2015/0076944 A1 Mar. 19, 2015

(30) Foreign Application Priority Data
Sep. 16, 2013 (KR) .................. 10-2013-0111074

(51) Int. Cl.
*H02K 3/28* (2006.01)
*H02K 3/52* (2006.01)

(52) U.S. Cl.
CPC .............. *H02K 3/28* (2013.01); *H02K 3/522* (2013.01); *H02K 2203/09* (2013.01)

(58) Field of Classification Search
CPC ....... H02K 2203/09; H02K 3/28; H02K 3/522
USPC .......................................................... 310/71
See application file for complete search history.

(56) References Cited

U.S. PATENT DOCUMENTS

| | | | | |
|---|---|---|---|---|
| 7,936,099 B2* | 5/2011 | Staudemann | ............ | H02K 3/28 310/180 |
| 7,948,130 B2* | 5/2011 | Kitagawa | ............... | H02K 3/522 310/71 |
| 8,035,263 B2* | 10/2011 | Kienzler | ................ | H02K 3/522 310/179 |
| 8,339,001 B2* | 12/2012 | Ghodsi-Khameneh | .. | H02K 3/28 310/416 |
| 8,519,583 B2* | 8/2013 | Sakaue | ................... | H02K 3/522 310/184 |
| 2006/0001326 A1* | 1/2006 | Even | .................. | H02K 15/0056 310/179 |
| 2009/0039720 A1* | 2/2009 | Tsukashima | ........... | H02K 3/522 310/71 |
| 2010/0207467 A1 | 8/2010 | Urano et al. | | |
| 2011/0156512 A1* | 6/2011 | Shimomura | ........... | H02K 1/148 310/71 |
| 2012/0037436 A1* | 2/2012 | Kwon | ....................... | H02K 3/50 180/65.1 |
| 2012/0293024 A1* | 11/2012 | Yokogawa | ............. | H02K 1/278 310/43 |

(Continued)

OTHER PUBLICATIONS

European Search Report dated Nov. 20, 2015 issued in Application No. 14183107.3.

*Primary Examiner* — Alex W Mok
(74) *Attorney, Agent, or Firm* — KED & Associates LLP

(57) ABSTRACT

A bus bar includes an insulator and a plurality of terminals inserted into the insulator and connected to the coil of a stator. The central axes of virtual circles extended from the inner circumferential surfaces of the plurality of terminals are differently disposed. The insulator may have a simple structure because the terminals having the same shape are assembled. The productivity of an assembly process can be improved.

15 Claims, 6 Drawing Sheets

(56) References Cited

U.S. PATENT DOCUMENTS

| | | | |
|---|---|---|---|
| 2012/0319512 A1* | 12/2012 | Nakagawa | H02K 1/278 310/71 |
| 2013/0106250 A1* | 5/2013 | Kanada | H02K 3/522 310/67 R |
| 2013/0113313 A1 | 5/2013 | Ikura | |
| 2014/0159519 A1* | 6/2014 | Forveille | H02K 3/522 310/71 |

* cited by examiner

[FIG. 1]

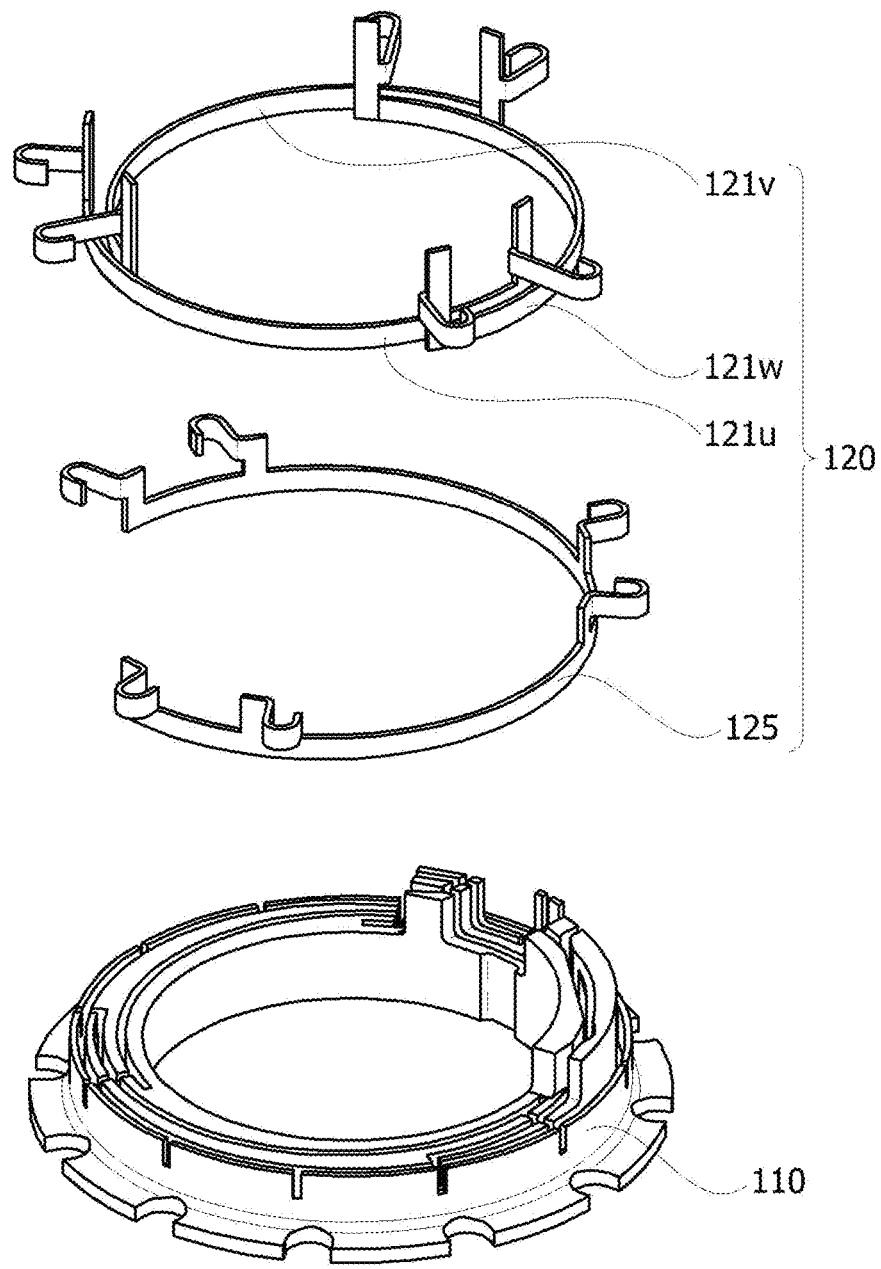
[FIG. 4]

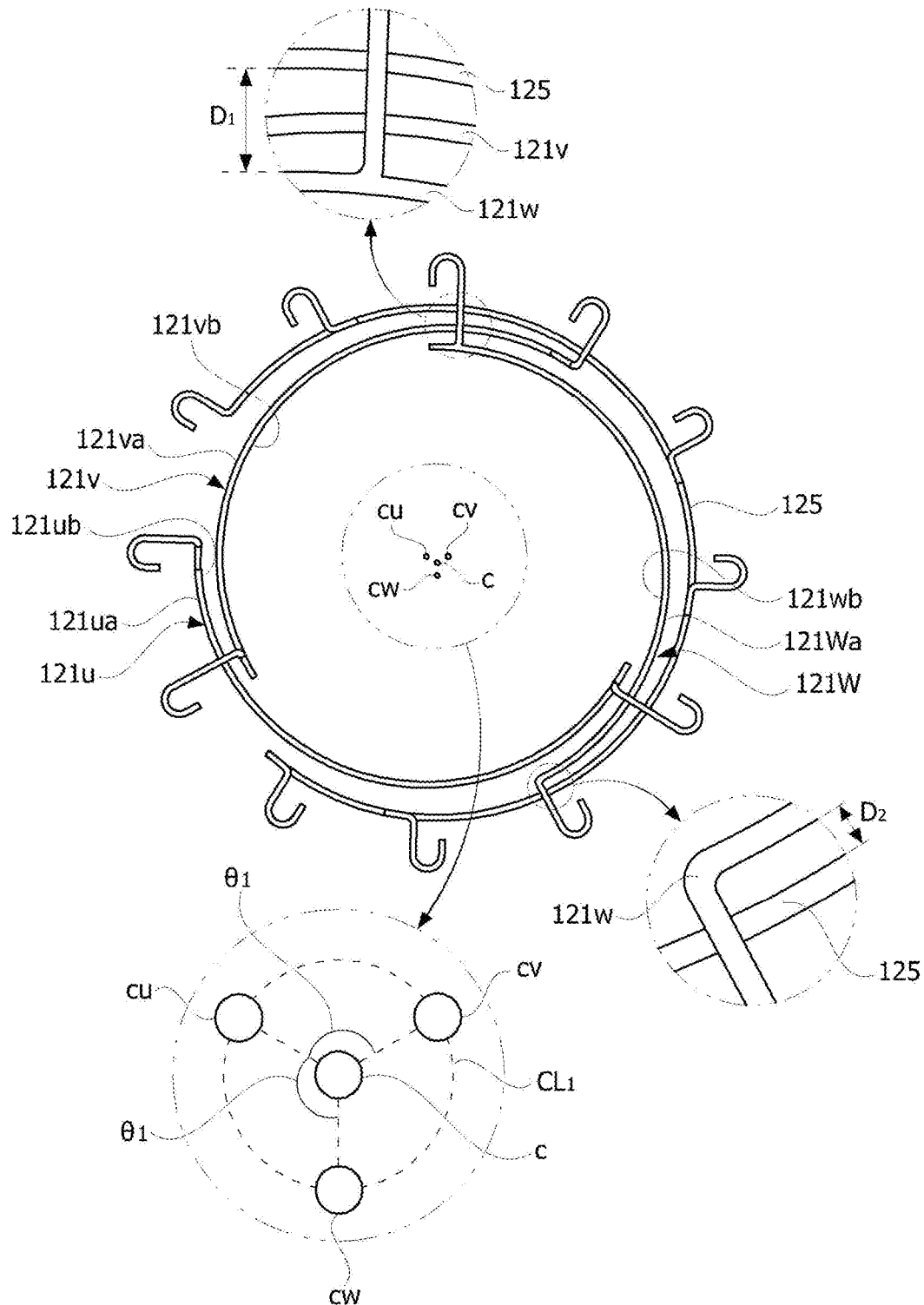
[FIG. 5]

【FIG. 6】
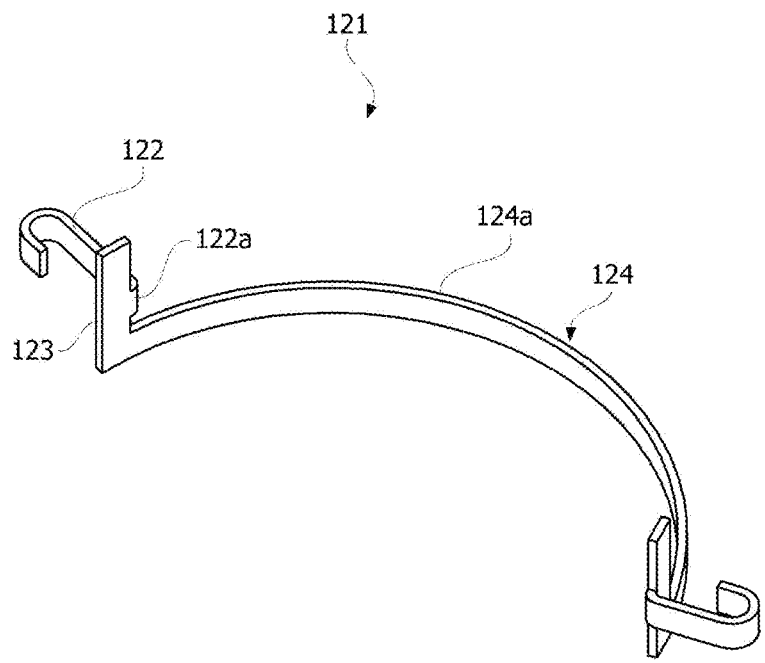
【FIG. 7】
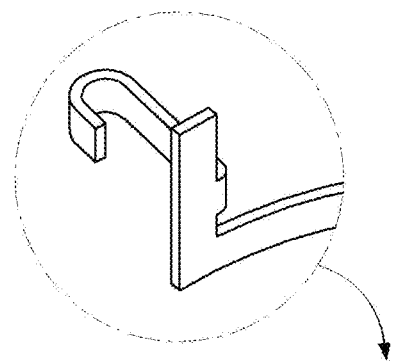
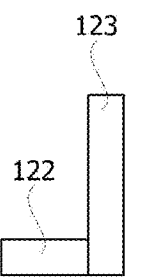
(a)
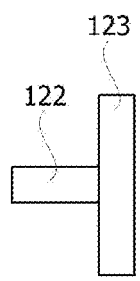
(b)
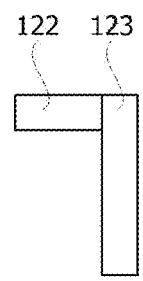
(c)

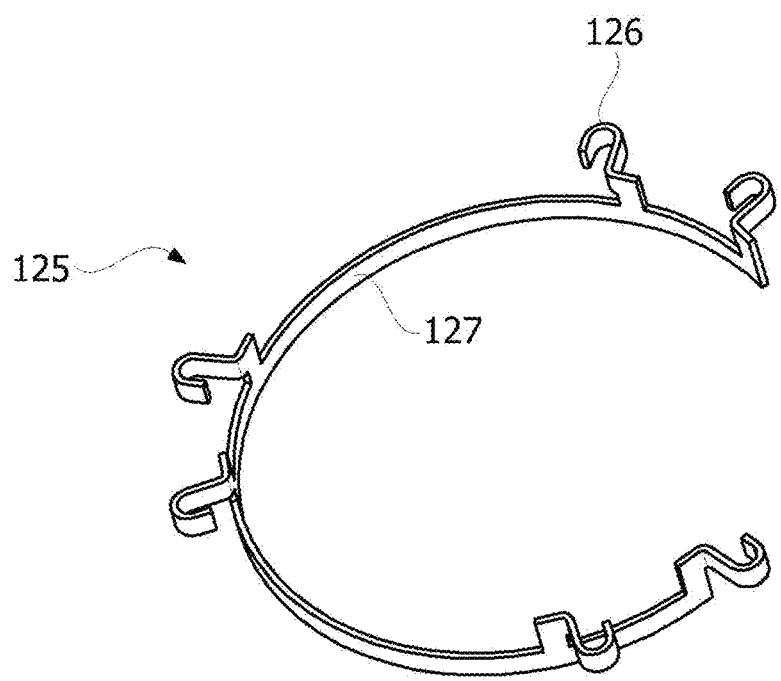
[FIG. 8]

BUS BAR AND MOTOR INCLUDING THE SAME

CROSS-REFERENCE TO RELATED APPLICATION

This application claims priority under 35 U.S.C. §119 to Korean Application No. 10-2013-0111074 filed on Sep. 16, 2013, whose entire disclosure is hereby incorporated by reference.

BACKGROUND

1. Field

The present application relates to a motor and, more particularly, to a bus bar and a motor including the bus bar.

2. Background

In general, an electronic power steering system (EPS) is an apparatus for guaranteeing the steering stability of a vehicle, and provides torque using a motor in the direction in which a driver performs steering, thereby making light handling. Such an EPS, unlike an existing hydraulic power steering (HPS) device, can improve steering performance and a steering sense by controlling the operation of a motor depending on driving conditions.

The Electronic Control Unit (ECU) of the EPS drives the motor based on driving conditions detected by a vehicle speed sensor, a torque angle sensor, and a torque sensor in order to guarantee revolution stability and provide rapid restoring force, thereby enabling safe driving for a driver. In general, an EPS motor used in the EPS includes a housing formed in a cylindrical shape and configured to have a top opened and a bracket coupled with the top of the housing in its outward shape. A stator is installed within the housing.

A rotor is disposed at the center of the stator and is rotated in response to an electromagnetic interaction with the stator. The rotor is supported by a rotating shaft in such a way as to be rotated. The steering shaft of a vehicle is connected to the upper part of the rotating shaft, and may provide motive power for assisting steering.

The stator includes a plurality of stator cores on which a coil is wound. A bus bar including a plurality of terminals is combined with the top of the stator. In this case, the end of the coil wound on the stator cores is upwardly protruded and connected to the terminals of the bus bar.

However, there are problems in that a loss rate of raw materials is great and a lot of efforts and cost are necessary to fabricate the molds because the terminals of the bus bar have different shapes and thus three types of molds have to be separately fabricated. There are also problems in that the structure of an insulator of the bus bar is complicated and thus there is a difficulty in injection mold because various types of terminals need to be assembled, and a task for checking whether or not each terminal has been accurately assembled with the insulator needs to be performed.

BRIEF DESCRIPTION OF THE DRAWINGS

The embodiments will be described in detail with reference to the following drawings in which like reference numerals refer to like elements wherein:

FIG. 4 is an exploded perspective view illustrating the bus bar in accordance with an embodiment of the present application;

FIG. 5 is a diagram illustrating the structure of terminals of the bus bar in accordance with an embodiment of the present application;

FIG. 6 is a perspective view illustrating the power terminal of the bus bar in accordance with an embodiment of the present application;

FIG. 7 is an exemplary diagram illustrating the relation of arrangement between the terminal end of the power terminal and a power connection terminal illustrated in FIG. 6; and FIG. 8 is a perspective view illustrating the neutral terminal of the bus bar in accordance with an embodiment of the present application.

DETAILED DESCRIPTION

Figure 1:
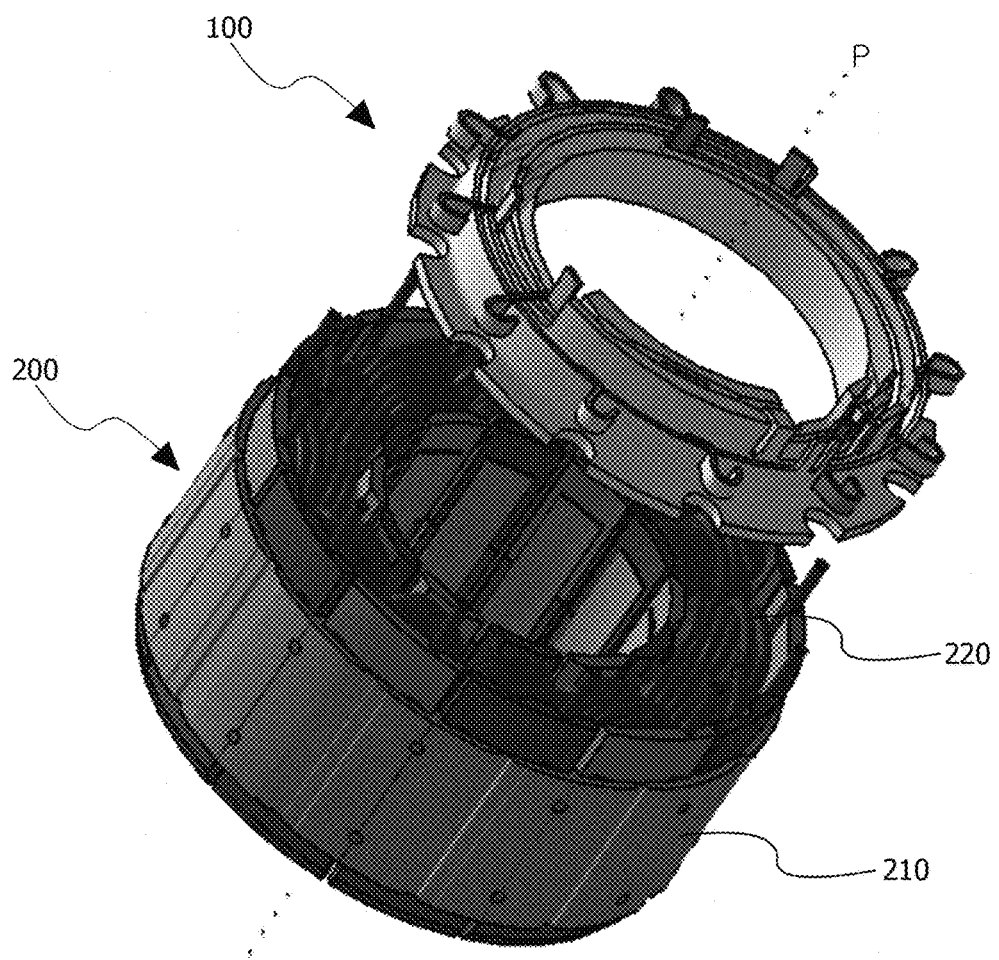
FIG. 1 is a perspective view of a motor in accordance with an embodiment of the present application.
Figure 2:
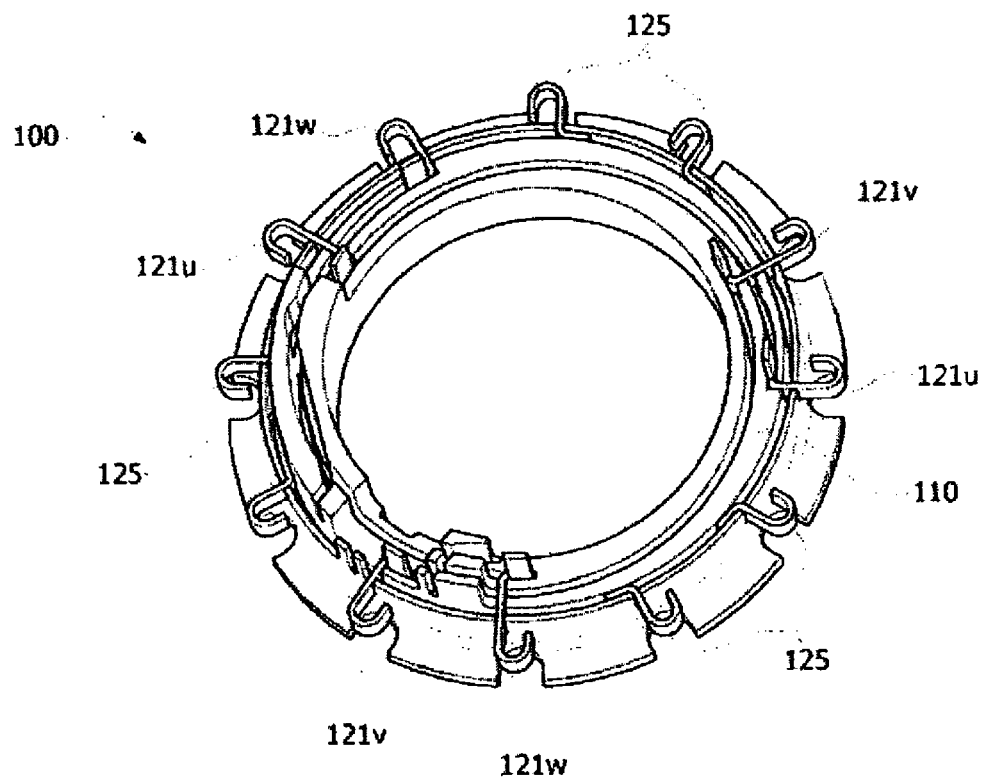
FIG. 2 is a perspective view of a bus bar in accordance with an embodiment of the present application.
Figure 3:
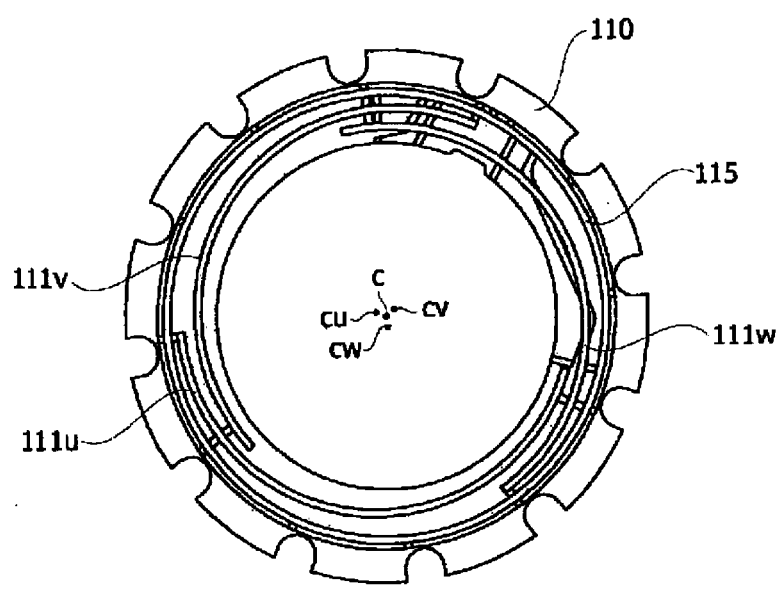
FIG. 3 is a cross-sectional view illustrating the insulator of the bus bar in accordance with an embodiment of the present application.

FIG. 1 is a perspective view of a motor in accordance with an embodiment of the present application, FIG. 2 is a perspective view of a bus bar in accordance with an embodiment of the present application, FIG. 3 is a cross-sectional view illustrating the insulator of the bus bar in accordance with an embodiment of the present application, and FIG. 4 is an exploded perspective view illustrating the bus bar in accordance with an embodiment of the present application.

Referring to FIG. 1, the motor in accordance with an embodiment of the present application includes a stator 200 and a bus bar 100. The stator 200 includes a stator core 210 configured to include a plurality of teeth (not shown) protruding toward the center of the motor and a coil 220 wound on the plurality of teeth. The bus bar 100 is combined with the stator 200 in an axis direction P in order to supply a power source to the coil 220 protruding upwardly from the stator 200.

Referring to FIGS. 2 to 4, the bus bar 100 in accordance with an embodiment of the present application includes an insulator 110 and a plurality of terminals 120. The insulator 110 forms an outward shape of the bus bar 100, and the body of the insulator 110 may be formed in a ring shape having a hollow or opening. The insulator 110 may be made of insulating materials, and may be a resin product formed by injection molding or other appropriate methods.

Referring to FIGS. 2 and 3, a plurality of grooves into which the terminals 120 can be inserted may be formed in the insulator 100. The grooves may have the same number as the terminals 120 in the circumferential direction of the insulator 100. The grooves include a plurality of power grooves 111$u$, 111$v$, and 111$w$ and a neutral groove 115. Power terminals 121$u$, 121$v$, and 121$w$ connected to the respective phases (e.g., a U phase, a V phase, and a W phase) of a three-phase power source are inserted into the plurality of power grooves 111$u$, 111$v$, and 111$w$. A neutral terminal 125 connected to a neutral line is inserted into the neutral groove 115. The number of power grooves 111$u$, 111$v$, and 111$w$ and the number of neutral grooves 115 may be selected in various ways depending on the intention of a designer and the number of stator cores 110.

Each of the plurality of power grooves 111$u$, 111$v$, and 111$w$ may be formed in an arc shape (or a partial ring shape). The central axes cu, cv, and cw of virtual circles extended from the respective power grooves 111$u$, 111$v$, and 111$w$ may be differently formed. For example, if three power grooves 111$u$, 111$v$, and 111$w$ are formed in the insulator 100 as shown in FIG. 3, the central axes cu, cv, and cw of the virtual circles extended from the respective power grooves 111u, 111v, and 111w may have different locations.

The power grooves 111u, 111v, and 111w may have the same circumference length. The power terminals 121u, 121v, and 121w having the same shape may not cross each other or may not be connected to each other, and may be inserted into the respective power grooves 111u, 111v, and 111w. The neutral groove 115 may be formed in a ring shape, and may be formed on the outside of the plurality of power grooves 111u, 111v, and 111w. The inside diameter of a virtual circle extended from the neutral groove 115 may be greater than the inside diameter of each of the virtual circles cu, cv, and cw extended from the respective power grooves 111u, 111v, and 111w. In some embodiments, the neutral groove 115 may be formed on the inside of the plurality of power grooves 111u, 111v, and 111w.

The central axes cu, cv, and cw of the virtual circles extended from the power grooves 111u, 111v, and 111w may be disposed at intervals of a specific angle on the basis of the central axis of the virtual circle extended from the neutral groove 115. For example, if three power grooves 111u, 111v, and 111w and a single neutral groove 115 are formed in the insulator 100, the central axes cu, cv, and cw of the virtual circles extended from the respective power grooves 111u, 111v, and 111w may be disposed at intervals of 120° on the basis of the central axis of a virtual circle c extended from the neutral groove 115.

The plurality of terminals 120 is inserted into the grooves formed in the insulator 100 and is connected to the ends of the coil 220 wound on the stator core 210.

Referring to FIGS. 2 and 4, the plurality of terminals 120 may include the three power terminals 121u, 121v, and 121w connected to the respective phases U, V, and W of the three-phase power source and a single neutral terminal 125 connected to a neutral line. The number of power terminals 121u, 121v, and 121w and the number of neutral terminals 125 may be selected in various ways depending on the intention of a designer and the number of stator cores 110.

The disposition structure of the power terminals 121u, 121v, and 121w and the neutral terminal 125 and the construction of each of the power terminals 121u, 121v, and 121w and the neutral terminal 125 are described in detail below with reference to FIGS. 5 to 8. FIG. 5 is a diagram illustrating the structure of terminals of the bus bar, and FIG. 6 is a perspective view illustrating the power terminal of the bus bar. FIG. 7 is an exemplary diagram illustrating the relation of arrangement between the terminal end of the power terminal and a power connection terminal illustrated in FIG. 6, and FIG. 8 is a perspective view illustrating the neutral terminal of the bus bar.

Referring to FIGS. 5 and 6, the three power terminals 121u, 121v, and 121w may have the same shape. If the power terminals 121u, 121v, and 121w are configured to have the same shape as described above, a loss rate of raw materials and the manufacturing cost of a mold can be reduced because only one type of mold has only to be fabricated.

As shown in FIG. 6, each of the power terminals 121u, 121v, and 121w may be formed in an arc shape or a partial ring shape, and may be disposed on the insulator 100 as shown in FIG. 5. However, the shape of the power terminals 121u, 121v, and 121w according to the present embodiment is not limited to an arc shape. In some embodiments, the power terminals 121u, 121v, and 121w may have various shapes in which they may be disposed on the insulator 100 in an arc shape using bending. For example, if the power terminals 121u, 121v, and 121w are made of materials that may be bent, each of the power terminals 121u, 121v, and 121w may be formed in a straight-line shape or a curve shape, and the power terminals 121u, 121v, and 121w may be inserted into the power grooves 111u, 111v, and 111w of the insulator 100.

Referring to FIG. 5, the central axes cu, cv, and cw of the virtual circles extended from the inner circumferential surfaces of the three power terminals 121u, 121v, and 121w and the central axis c of the virtual circle extended from the neutral terminal 125 may have different locations. The central axis of a virtual circle CL1 that connects the central axes cu, cv, and cw of a plurality of virtual circles extended from the plurality of power terminals 121u, 121v, and 121w may be identical with the central axis c of the virtual circle extended from the neutral terminal 125.

The central axes cu, cv, and cw of the virtual circles extended from the inner circumferential surfaces of the power terminals 121u, 121v, and 121w may be disposed at a specific interval around the central axis c of the virtual circle extended from the inner circumferential surface of the neutral terminal 125. For example, if three power terminals 121u, 121v, and 121w and a single neutral terminal 125 are disposed in the insulator 110, the central axes cu, cv, and cw of the virtual circles extended from the inner circumferential surfaces of the power terminals 111u, 111v, and 111w may be disposed at the same angle θ1 around the central axis c of the virtual circle extended from the neutral terminal 125. In this case, the angle θ1 may be 120°.

An outside surface 121ua of the first power terminal 121u is disposed to face the inside surface 121wb of the third power terminal 121w at one end (e.g., a 4 o'clock point in FIG. 5) of the first power terminal 121u. An inside surface 121ub of the first power terminal 121u is disposed to face the outside surface 121va of the second power terminal 121v at the other end (e.g., a 9 o'clock point in FIG. 5) of the first power terminal 121u. The second power terminal 121v and the third power terminal 121w have the same disposition structure as the first power terminal 121u.

In such a construction, the central axes cu, cv, and cw of the virtual circles extended from the inner circumferential surfaces of the power terminals 111u, 111v, and 111w and the central axis c of the virtual circle extended from the neutral terminal 125 may be offset each other and disposed. The interval between the ends of the plurality of power terminals 121u, 121v, and 121w on one side and a virtual line extended from the neutral terminal 125 may be different from the interval between the ends of the plurality of power terminals 121u, 121v, and 121w on the other side and the virtual line extended from the neutral terminal 125.

For example, the interval D1 between one end of the third power terminal 121w and a virtual line extended from the neutral terminal 125 may be wider than the interval D2 between the other end of the third power terminal 121w and a virtual line extended from the neutral terminal 125. Likewise, such intervals are different in the first power terminal 121u and the second power terminal 121v.

Referring to FIG. 6, the power terminal 121 may include a first connection member 124, at least one power connection terminal 123 combined with the first connection member 124 and connected to any one of the phases of a three-phase power source, and at least one terminal end 122 combined with the power connection terminal 123 and connected to the end of the coil 220 wound on the stator core 210.

The first connection member 124 extends in a circumferential direction (i.e., the rotation direction of the axis), and has specific curvature. The extension length and curvature of the first connection member 124 may be properly controlled. The power connection terminal 123 may be combined with both ends of the first connection member 124. The power connection terminal 123 may protrude upwardly (i.e., in the axis direction) from the insulator 110 and connected to a power source.

Referring to FIG. 6, the terminal end 122 is combined with the power connection terminal 123, and the direction from which the terminal end 122 protrudes may be vertical to the direction from which the power connection terminal 123 protrudes. If the power connection terminal 123 protrudes vertically upwardly (i.e., the axis direction) from the insulator 110, the terminal end 122 may protrude in the direction horizontal to the insulator 110 (i.e., the direction vertical to the axis direction).

A point 122a at which the terminal end 122 is connected to the power connection terminal 123 may be placed higher than the top surface 124a of the first connection member 124. Although the plurality of power terminals 121 is offset and disposed, they may be projected effectively outward and connected to the coil.

As shown in FIG. 7, the terminal end 122 may be combined with the power connection terminal 123 at various locations (see (a) to (c) of FIG. 7) of the power connection terminal 123. The terminal end 122 may be combined with the power connection terminal 123 at heights different from the height of the first connection member 124. The end of the terminal end 122 may be bent in a ring shape. The terminal end 122 may be bent in the same direction in terms of the efficiency of mold fabrication, but part of or the entire terminal end 122 may be bent in different directions.

In the present embodiment, the neutral terminal 125 may be formed in a ring shape, and may be disposed on the outside of the plurality of power terminals 121u, 121v, and 121w. In some embodiments, the neutral terminal 125 may be disposed on the inside of the plurality of power terminals 121u, 121v, and 121w.

Referring to FIG. 8, the neutral terminal 125 may include a second connection member 127 and at least one terminal end 126 combined with the second connection member 127 and connected to the coil 220 wound on the stator cores 210. The second connection member 127 may be extended in the circumferential direction, and may be longer than the first connection member 124 (see FIG. 5).

As shown in FIG. 8, the terminal end 126 of the neutral terminal 125 may protrude in the direction horizontal to the insulator 110 at a height different from that of the second connection member 127. Every two of the terminal ends 126 may form a group, and the two terminal ends of each of the groups may be formed adjacent to each other. In such a case, the terminal end 122 of the two power terminals 121 may be disposed in the space between the groups.

Like in the terminal end 122 of the power terminals 121, the end of each of the terminal ends 126 of the neutral terminal 125 may be bent in a ring shape. In this case, the plurality of terminal ends 126 may be bent in the same direction.

As described above, in accordance with an embodiment of the present application, a loss rate of raw materials and the manufacturing cost of a mold can be reduced because the terminals included in the bus bar are configured in the same shape and only one type of mold has only to be fabricated.

Furthermore, in accordance with an embodiment of the present application, the insulator has a simple structure because the terminals having the same shape are assembled. Furthermore, the productivity of an assembly process can be improved because whether or not each terminal has been properly assembled with the insulator does not need to be checked.

In the present embodiment, an example in which 12 terminals are included in the bus bar (i.e., a 12-pin bus bar) has been illustrated, but the present application may be applied to the case in which various numbers of terminals are included in the bus bar.

Accordingly, the present application has been made keeping in mind the above problems occurring in the prior art, and an object of the present application is to provide a bus bar capable of reducing a loss rate of raw materials and the manufacturing cost of a mold and minimizing a process for assembling by simplifying the shape of terminals and the assembly structure of an insulator and the terminals, and a motor including the bus bar.

A bus bar may include an insulator and a plurality of terminals disposed in the insulator and configured to have curvature, wherein the central axes of a plurality of virtual circles extended from the plurality of terminals having curvature are differently formed.

Each of the plurality of terminals may have a partial ring shape, and the central axes of a plurality of virtual circles extended from the partial rings may be offset each other and disposed.

The plurality of terminals may include a plurality of power terminals connected to a three-phase power source and a neutral terminal, and the central axes of virtual circles configured to connect the central axes of a plurality of virtual circles extended from the plurality of power terminals may be identical with the central axis of a virtual circle extended from the neutral terminal.

The angle between the central axes of the plurality of virtual circles extended from the plurality of power terminals may be identical around the central axis of the virtual circle extended from the neutral terminal.

The angle between the central axes of the plurality of virtual circles extended from the plurality of power terminals may be 120°.

The interval between one end of each of the plurality of power terminals and a virtual line extended from the neutral terminal may be wider than the interval between the other end of each of the plurality of power terminals and the virtual line extended from the neutral terminal.

Each of the plurality of power terminals may include a first power terminal connected to the three-phase power source, a second power terminal connected to the three-phase power source, and a third power terminal connected to the three-phase power source.

The inside surface of the other end of the first power terminal may be disposed to face the outside surface of the second power terminal, and the outside surface of one end of the first power terminal may be disposed to face the inside surface of the third power terminal.

The plurality of power terminals may have the same shape.

Each of the plurality of power terminals may include a first connection member configured to have specific curvature in a length direction, at least one power connection terminal combined with the first connection member and connected to any one of phases of the three-phase power source, and at least one terminal end combined with the power connection terminal and connected to a coil wound on the stator.

The power connection terminal may protrude in an axis direction based on the first connection member.

A point at which the terminal end may be connected to the power connection terminal may be disposed higher than a top surface of the first connection member in the axis direction.

The terminal end may protrude in the direction vertical to the axis direction.

The neutral terminal may include a second connection member configured to have specific curvature in a length direction and at least one terminal end combined with the second connection member and connected to a coil wound on the stator, wherein the second connection member may be longer than the first connection member.

A motor according to an aspect of the present application may include a stator configured to comprise a stator core and a coil wound on the stator core and a bus bar combined with the stator, wherein the bus bar includes an insulator and a plurality of terminals disposed in the insulator and connected to the coil, and the central axes of virtual circles extended from the plurality of terminals are differently disposed.

Terms, such as the first and the second, may be used to describe various elements, but the elements should not be restricted by the terms. The terms are used to only distinguish one element and the other element from each other. For example, a first element may be named a second element without departing from the scope of the present application. Likewise, a second element may be named a first element. A term "and/or" includes a combination of a plurality of related and described items or any one of a plurality of related and described items.

When it is said that one element is "connected" or "coupled" with the other element, it should be understood that one element may be directly connected or coupled with the other element, but a third element may exist between the two elements. In contrast, when it is said that one element is "directly connected" or "directly coupled" with the other element, it should be understood that a third element does not exist between the two elements.

All terms used herein, including technical or scientific terms, have the same meanings as those typically understood by those skilled in the art unless otherwise defined. Terms, such as ones defined in common dictionaries, should be construed as having the same meanings as those in the context of related technology and should not be construed as having ideal or excessively formal meanings unless clearly defined in this application.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A bus bar comprising:
   an insulator;
   a first power terminal disposed in the insulator;
   a second power terminal disposed in the insulator;
   a third power terminal disposed in the insulator; and
   a neutral terminal disposed in the insulator,
   wherein central axes of a plurality of virtual circles extended from the first power terminal to the third power terminal having curvature are different,
   wherein an inside surface of a second end of the first power terminal faces an outside surface of the second power terminal, and an outside surface of a first end of the first power terminal faces an inside surface of the third power terminal.

2. The bus bar of claim 1, wherein:
   each of the first to the third power terminals has a partial ring shape, and
   central axes of a plurality of virtual circles extended from the partial rings are offset from each other.

3. The bus bar of claim 1, wherein:
   a central axis of virtual circle connecting central axes of a plurality of virtual circles extended from the first to the third power terminals is identical with a central axis of a virtual circle extended from the neutral terminal.

4. The bus bar of claim 3, wherein an angle between the central axes of the plurality of virtual circles extended from the first to the third power terminals is identical around the central axis of the virtual circle extended from the neutral terminal.

5. The bus bar of claim 4, wherein the angle between the central axes of the plurality of virtual circles extended from the first to the third power terminals is 120°.

6. The bus bar of claim 3, wherein an interval between a first end of each of the first to the third power terminals and a virtual line extended from the neutral terminal is different from an interval between a second end of the first to the third power terminals and the virtual line extended from the neutral terminal.

7. The bus bar of claim 3, wherein the first to the third power terminals have an identical shape.

8. The bus bar of claim 3, wherein each of the first to the third power terminals comprises:
   a first connection member having specific curvature in a length direction;
   at least one power connection terminal combined with the first connection member and connected to any one of phases of the three-phase power source; and
   at least one terminal end combined with the power connection terminal and connected to a coil wound on the stator.

9. The bus bar of claim 8, wherein the power connection terminal protrudes in an axis direction based on the first connection member.

10. The bus bar of claim 8, wherein a point at which the terminal end is connected to the power connection terminal is higher than a top surface of the first connection member in an axis direction.

11. The bus bar of claim 8, wherein the terminal end protrudes in a direction vertical to an axis direction.

12. The bus bar of claim 3, wherein the neutral terminal comprises:
    a second connection member having specific curvature in a length direction; and at least one terminal end combined with the second connection member and connected to a coil wound on the stator,
wherein the second connection member is longer than the first connection member.

13. A motor, comprising:
a stator configured to comprise a stator core and a coil wound on the stator core; and
a bus bar combined with the stator,
wherein the bus bar comprises an insulator and a plurality of terminals disposed in the insulator and connected to the coil, and
wherein central axes of virtual circles extended from the plurality of terminals are different,
wherein the plurality of terminals comprises a plurality of power terminals connected to a three-phase power source and a neutral terminal,
wherein a central axis of virtual circle connecting central axes of the plurality of power terminals is identical with a central axis of the neutral terminal,
wherein an angle between the central axes of the plurality of power terminals is identical around the central axis of the neutral terminal.

14. The motor of claim 13, wherein an interval between a first end of each of the plurality of power terminals and a virtual line extended from the neutral terminal is different from an interval between a second end of each of the plurality of power terminals and the virtual line extended from the neutral terminal.

15. The motor of claim 13, wherein the plurality of power terminals have an identical shape.

* * * * *